United States Patent [19]

Medawar et al.

[11] 3,984,974

[45] Oct. 12, 1976

[54] THRUST SPOILING APPARATUS AND METHOD

[75] Inventors: George E. Medawar, San Diego; Felix Hom, La Mesa, both of Calif.

[73] Assignee: Rohr Industries, Inc., Chula Vista, Calif.

[22] Filed: Nov. 29, 1972

[21] Appl. No.: 310,339

[52] U.S. Cl. .................................. 60/230; 60/232; 239/265.37
[51] Int. Cl.² .......................................... F02K 1/20
[58] Field of Search .................... 60/228, 230, 232; 239/265.19, 265.33, 265.11

[56] References Cited
UNITED STATES PATENTS

| | | | |
|---|---|---|---|
| 2,871,656 | 3/1959 | Johnson | 60/230 |
| 3,015,936 | 1/1962 | Brewer | 239/265.19 |
| 3,019,600 | 2/1962 | Peek | 60/230 X |
| 3,550,855 | 12/1970 | Feld | 60/230 X |
| 3,579,991 | 5/1971 | Nelson | 60/232 |
| 3,696,617 | 10/1972 | Ellis | 60/230 |

Primary Examiner—Clarence R. Gordon
Attorney, Agent, or Firm—Patrick J. Schlesinger; Frank D. Gilliam

[57] ABSTRACT

A streamline shroud surrounding a jet aircraft engine terminates forwardly of the aft end of the engine tail pipe, which comprises a secondary nozzle. Two or more deflector doors in stowed position combine to form a sleeve surrounding the aft portion of the tail pipe, and the trailing edges of these doors extend downstream and converge beyond the tail pipe to form a primary nozzle, which has an exit flow area smaller than that of the secondary nozzle, and of proper size and configuration to provide required mass flow, velocity and pressure for normal flight operation. The doors swing outwardly and rearwardly on linkage carried by the sponsons to a deployed position spaced aft of the tail pipe and disposed transversely to the tail pipe axis to deflect flow laterally and nullify thrust. The blocking action of the deployed doors produces a back pressure effect which tends to reduce mass flow, but since the secondary nozzle exit area is greater than that of the primary nozzle, which is removed upon deployment of the doors, this compensates for the back pressure effect and maintains the mass flow substantially uniform.

7 Claims, 4 Drawing Figures

THRUST SPOILING APPARATUS AND METHOD

BACKGROUND OF THE INVENTION

This invention lies in the field of gas turbine, or jet, engines which produce reaction thrust by ejecting a high velocity stream of gas from the exhaust nozzle or tail pipe of the gas turbine. Airplanes equipped with jet engines have very high flying speeds and very high landing speeds. The landing speeds place an excessive burden on the wheel brakes because of the low drag effect of the airplanes themselves and also because of the residual thrust of the engines. It is common practice to reduce the burden of the brakes by the use of thrust reversers or spoilers, which also may be used in the flight regime to facilitate various maneuvers.

The various types of apparatus for modifying thrust which are presently in use perform their intended functions quite satisfactorily, but they have a common drawback which is a matter of concern. The blocking effect which deflects the exhaust gases laterally also produces a back pressure effect which in turn tends to reduce the mass flow at any given operating condition. Such reduction is deleterious to the engine and it is highly desirable to eliminate it if possible.

SUMMARY OF THE INVENTION

The present invention provides a satisfactory solution to this problem by means of simple but effective apparatus which involves low first cost as well as low maintenance expense. Generally stated, the apparatus includes an elongate streamlined shroud connected to and surrounding all or part of the engine and may be a nacelle or other portion of the airplane structure. The main body of the shroud terminates in an aft edge which lies in a plane transverse to the longitudinal axis of the shroud and engine, and preferably at least the aft portion of the tail pipe extends rearwardly beyond the main body. Two or more deflector doors are arcuate in cross section, and in stowed position, combine to form a sleeve surrounding the aft portion of the tail pipe, with their forward ends adjacent to the aft edge of the shroud main body and shaped to complete its streamline configuration.

The doors may be mounted in various ways for stowing and deployment but in the disclosed form a pair of sponsons, one at each side, extend rearward from the shroud main body and each of the two doors is mounted to both of the sponsons by linkage machanism which carries them between stowed and deployed position. In deployed position the doors are spaced rearwardly a selected distance, for example the exit diameter of the tail pipe, and engage each other to block rearward gas flow. At this distance the doors exert a back pressure effect which tends to reduce the mass flow to a significant degree.

In order to reduce or nullify this back pressure effect on the engine, a pair of nozzle segments, which are generally arcuate in cross section, fit together in stowed position to form a convergent extrusion of the secondary nozzle which becomes the primary nozzle with its exhaust flow exit area predetermined to produce desired mass flow, velocity and pressure for normal flight operation. When the deflector doors are deployed, these nozzle segments are also deployed to a position spaced from the primary nozzle. The latter having a predetermined exhaust flow exit area sufficiently greater than that of the primary nozzle to retain the mass flow substantially undiminished when the doors are deployed.

The construction of the apparatus is simplified by forming the primary nozzle segments as the trailing edges of the deflector doors. Thus, secondary linkage is avoided and the improved spoiler apparatus involves only two major components.

The area ratios of the two nozzles may be determined, and confirmed, by flow tests and/or they may be determined mathematically on the basis of known flow characteristics information with the use of existing and well established compressible flow tables presently used for solving fluid flow problems.

BRIEF DESCRIPTION OF THE DRAWINGS

Various advantages and features of novelty will be apparent as the description proceeds in conjunction with the accompanying drawings, in which.

DESCRIPTION OF PREFERRED EMBODIMENT

Figure 1:
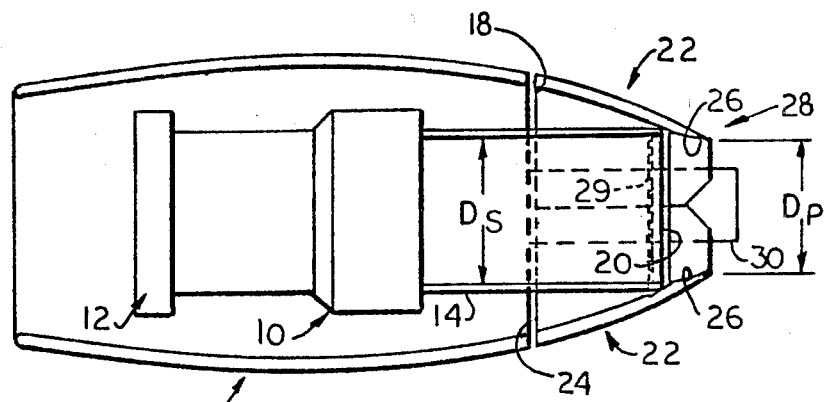
FIG. 1 is a schematic side elevational view, partly in section, of the apparatus in stowed position.

The general arrangement schematically illustrated in FIG. 1 shows apparatus embodying the invention in its relation to other elements of a typical fan jet aircraft engine installation. The engine turbine 10, having a longitudinal fore and aft axis of rotation, is connected at its forward end to an axial flow compressor 12, and is provided at its aft end with a tail pipe 14 for ejecting the products of combustion from the turbine. A shroud 16 surrounds the components of the engine, and may be a portion of a fuselage, wing or other aircraft structure, but for simplicity is shown as having the form of a typical nacelle which is generally annular in cross section and is generally coaxial with the engine. The aft portion of the main body of the shroud terminates in an aft edge 18, which defines a plane normal to the engine axis. At least the aft portion of the tail pipe 14 extends rearwardly beyond this plane.

The tail pipe 14 is shown as being cylindrical, but may have any profile suitable for the performance of the engine on which it is installed. The aft or trailing edge 20 of the tail pipe also defines a plane normal to the engine axis, and this aft end 20 comprises the discharge end of the secondary nozzle.

In the preferred form, a pair of deflector doors 22 is provided, each being generally arcuate in cross section. The doors in stowed position combine to form a sleeve surrounding the tail pipe with their forward edges 24 adjacent the aft edge 18 of the shroud main body, and their exteriors shaped to form a streamline extension of the shroud.

The trailing edges of the doors extend rearwardly beyond the secondary nozzle 20 and comprise converging nozzle segments 26, the lateral edges of which meet in their stowed position to define a primary nozzle 28, having an exhaust exit diameter $D_p$ which is smaller than the exit diameter $D_s$ of the secondary nozzle 20 by an amount calculated as set forth later herein. Sealing means 29 are provided between the deflector doors and the aft portion of the tail pipe to seal against leakage of exhaust gases.

Figure 2:
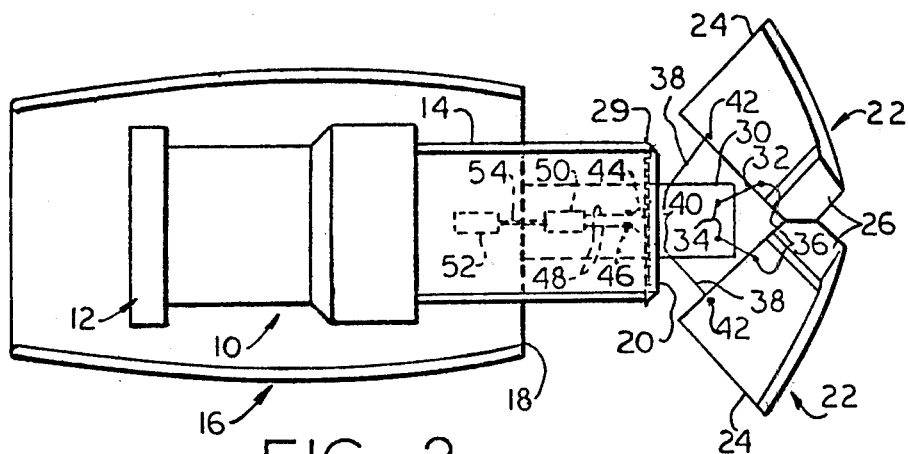
FIG. 2 is a view similar to FIG. 1 with the apparatus in deployed position.

As illustrated in FIG. 2, a pair of laterally spaced sponsons 30, one at each side of the tail pipe, extend rearwardly from shroud 16 to support the deflector doors with their nozzle segments. Each door is connected to each sponson by aft links 32, pivoted to the sponsons at 34 and to the doors at 36, and by forward links 38, pivoted to the sponsons at 40 and to the doors at 42. The links 38 have inward extensions 44 which are pivotally connected at 46 to links 48. The latter in turn are connected to a carriage 50, which is actuated by a servo motor 52 through a piston rod 54. Axial movement of the carriage 50 swings the links, which are of unequal length, to cause the doors to swing outwardly and rearwardly into the angular transverse blocking position shown, with their ends in engagement with each other to block rearward flow and deflect the discharged gases laterally to nullify thrust.

Figure 3:
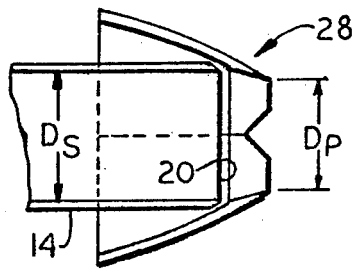
FIG. 3 is a schematic view corresponding to FIG. 1 showing the relation of the primary and secondary nozzles.
Figure 4:
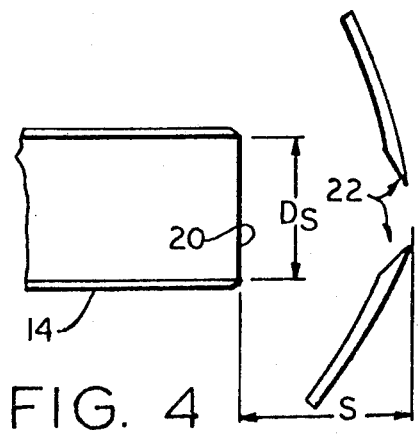
FIG. 4 is a schematic view corresponding to FIG. 2 showing the deflector doors and nozzle segments in deployed position.

FIGS. 3 and 4 are schematic representations of actual tests conducted with apparatus such as that schematically shown in FIGS. 1 and 2. The diameter $D_s$ of secondary nozzle 20 is greater than the diameter $D_p$ of the primary nozzle 28, and the exhaust flow exit areas vary correspondingly. The ratio of the two areas depends on various factors including the selected nozzle pressure ratio, velocity, mass flow, and the distance S between the exit plane of the secondary nozzle and a selected general transverse plane of the deployed doors 22. As the distance S increases in percentage of the diameter $D_s$ the back pressure effect decreases, and consequently the ratio of $D_s$ to $D_p$ also decreases to maintain the mass flow constant. Ordinarily the plane of the deployed doors is not spaced much more than one nozzle diameter aft, and the ratio of $D_s$ to $D_p$ is only a few percentage points more than unity. However, the small increase in exit area is highly significant because it retains the mass flow at normal and greatly improves engine performance.

Having thus described the invention, what is claimed as new and useful and is desired to be secured by U.S. Letters Patent is:

1. Apparatus for spoiling the thrust of a turbojet engine having a rearwardly discharging turbine tail pipe projecting directly rearwardly from the engine while maintaining a substantially constant mass flow through the tail pipe, comprising: a secondary nozzle forming the fixed exit of the tail pipe and having an exit area a predetermined amount greater than that required to provide a predetermined mass flow during normal engine operation; a stowable and deployable primary nozzle converging rearwardly and having an entry area equal to the exit area of the secondary nozzle and a smaller exit area sized to provide said predetermined mass flow during normal engine operation; the primary nozzle having a stowed position concentric with the secondary nozzle and with its entry end at the plane of the secondary nozzle exit to form a directly continuous extension thereof with gradually reducing area; and a plurality of deflector doors having a stowed position in which at least their forward portions surround the aft portion of the tail pipe and a deployed position spaced aft of the tail pipe and extending transversely of the axis of the tail pipe to deflect the exhaust flow laterally and nullify the thrust of the engine; the primary nozzle being movable upon deployment of the deflector doors to a position spaced from the secondary nozzle to transfer to the latter control of the exhaust flow from the tail pipe; the predetermined greater exit area of the secondary nozzle being sufficient to maintain said predetermined mass flow despite the back pressure created by the deployed deflector doors.

2. Apparatus as claimed in claim 1; the primary nozzle being deployable rearwardly of the secondary nozzle a distance sufficient to eliminate its exit flow control effect.

3. Apparatus as claimed in claim 2; the primary nozzle being movable directly in response to movement of the deflector doors.

4. Apparatus as claimed in claim 1; the deflector doors comprising a plurality of generally arcuate segments cooperating in stowed position to form a sleeve surrounding the tail pipe; and the primary nozzle comprising a plurality of nozzle segments carried by the deflector doors.

5. Apparatus as claimed in claim 1; the deflector doors comprising a plurality of generally arcuate segments cooperating in stowed position to form a sleeve surrounding the tail pipe; and the primary nozzle comprising a plurality of generally arcuate nozzle segments; each segment forming the aft end of one of the deflector doors.

6. Apparatus as claimed in claim 5; and a shroud surrounding the engine and having an aft edge extending in a transverse plane; the forward edges of the deflector doors in stowed position being adjacent to the aft edge of the shroud, with the deflector doors forming a smooth streamlined continuation of the shroud for normal flight operation.

7. Apparatus as claimed in claim 6; a plurality of sponsons extending rearward from the aft edge of the shroud; a plurality of linkage mechanisms pivotally connected at their inner ends to the sponsons and at their outer ends to the deflector doors and movable to swing the deflector doors between stowed and deployed positions; and servo motor means carried by the sponsons to actuate the linkage mechanisms.

* * * * *